(12) United States Patent
Wang et al.

(10) Patent No.: US 10,606,046 B2
(45) Date of Patent: Mar. 31, 2020

(54) ZOOM LENS

(71) Applicant: Young Optics Inc., Hsinchu (TW)

(72) Inventors: Kuo-Chuan Wang, Hsinchu (TW); Bing-Ju Chiang, Hsinchu (TW); Pin-Hsuan Hsieh, Hsinchu (TW); Kai-Yun Chen, Hsinchu (TW); Yu-Hung Chou, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 14/804,283

(22) Filed: Jul. 20, 2015

(65) Prior Publication Data

US 2017/0023781 A1    Jan. 26, 2017

(51) Int. Cl.
*G02B 15/177* (2006.01)
*G02B 13/14* (2006.01)
*G02B 13/18* (2006.01)

(52) U.S. Cl.
CPC ........... *G02B 15/177* (2013.01); *G02B 13/14* (2013.01); *G02B 13/18* (2013.01)

(58) Field of Classification Search
CPC .................................................... G02B 15/20
USPC ........ 359/761, 770, 781, 680, 681, 691, 696
See application file for complete search history.

(56) References Cited

U.S. PATENT DOCUMENTS

| | | | |
|---|---|---|---|
| 4,406,523 A | 9/1983 | Sato et al. | |
| 5,126,884 A | 6/1992 | Sato | |
| 5,155,629 A | 10/1992 | Ito et al. | |
| 6,809,882 B2 | 10/2004 | Takatsuki | |
| 6,917,477 B2 | 7/2005 | Takatsuki | |
| 7,075,729 B2 | 7/2006 | Wang | |
| 8,000,030 B2 * | 8/2011 | Tang | G02B 13/0045 359/714 |
| 8,369,021 B2 | 2/2013 | Muratani et al. | |
| 8,477,427 B2 | 7/2013 | Muratani et al. | |
| 8,654,451 B2 | 2/2014 | Kunugise | |
| 2002/0191306 A1 * | 12/2002 | Toyama | G02B 15/177 359/689 |
| 2006/0274427 A1 * | 12/2006 | Wantanabe | G02B 15/177 359/676 |
| 2011/0102913 A1 * | 5/2011 | Neil | G02B 13/18 359/717 |
| 2012/0044388 A1 * | 2/2012 | Ito | G02B 15/173 348/240.3 |
| 2013/0300868 A1 * | 11/2013 | Yamamoto | G02B 15/173 348/143 |
| 2013/0329305 A1 * | 12/2013 | Kunugise | G02B 15/177 359/691 |
| 2014/0043691 A1 * | 2/2014 | Tomioka | G02B 13/14 359/680 |
| 2015/0092281 A1 * | 4/2015 | Aoi | G02B 13/18 359/687 |

(Continued)

OTHER PUBLICATIONS https://web.archive.org/web/20120325065532/http://oharacorp.com/fpl.html; Date: Mar. 25, 2012, Ohara Corporation.*

*Primary Examiner* — Travis S Fissel
(74) *Attorney, Agent, or Firm* — JCIPRNET

(57) ABSTRACT

A zoom lens arranged along an optical axis includes a first lens group and a second lens group. The second lens group has at least one aspheric lens. The first lens group moves toward an image side and the second lens group moves away from the image side along the optical axis during zooming. The first lens group is moved for focusing, and the second lens group is moved for zooming.

16 Claims, 8 Drawing Sheets

(56) References Cited

U.S. PATENT DOCUMENTS

2015/0098011 A1\* 4/2015 Huang ............... G02B 13/0045
348/360

\* cited by examiner

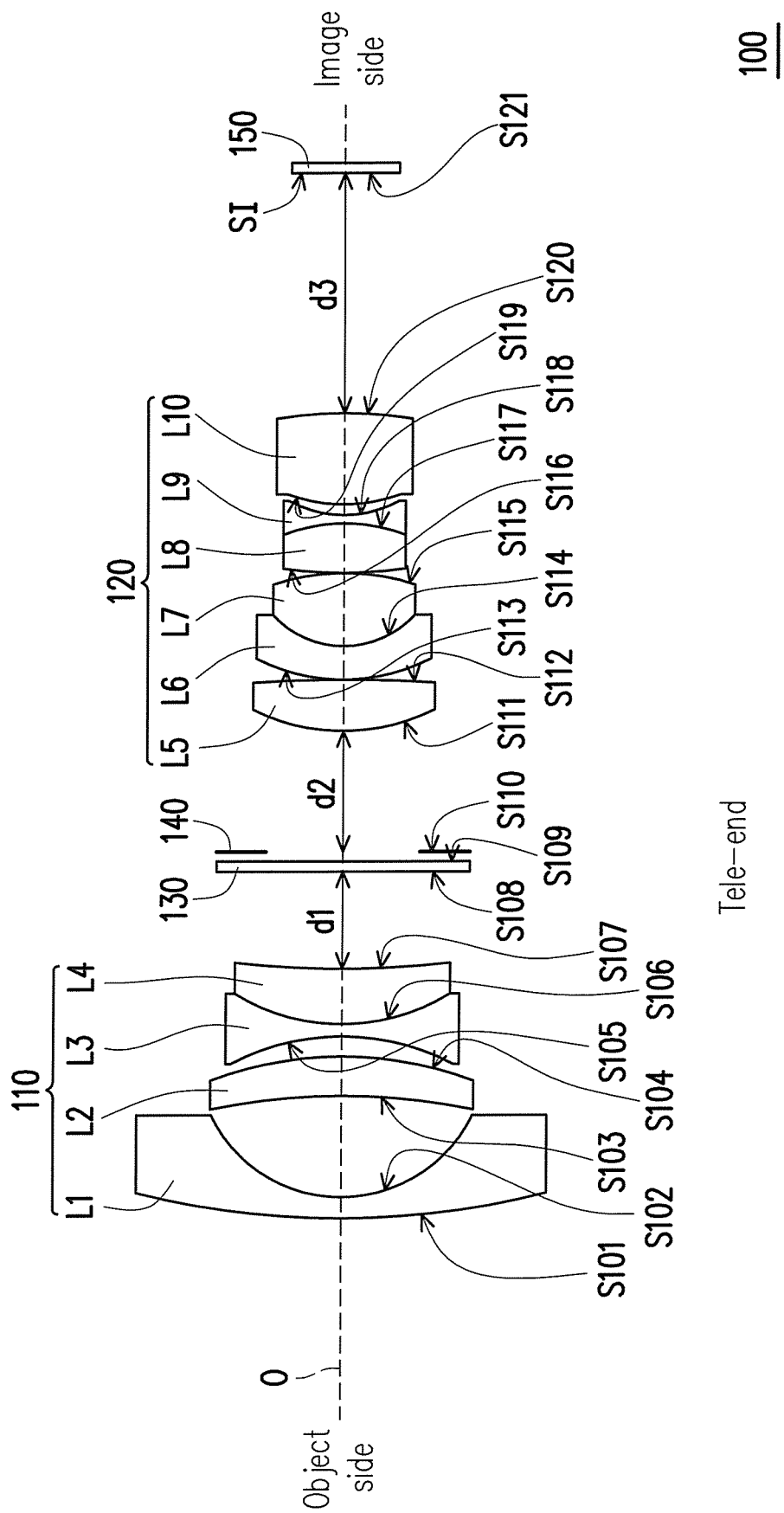
FIG. 1B Tele-end

ZOOM LENS

BACKGROUND OF THE INVENTION

1. Field of the Invention

The invention generally relates to a lens, and more particularly to a zoom lens.

2. Description of Related Art

Cameras utilize zoom lens so that a user can conveniently adjust a zoom range at different focal lengths. In addition, lenses are being developed to achieve a large field of view, and be suitable for large sensors. However, when zoom lenses are applied with large sensors, it is difficult to achieve a large zoom ratio while also achieving high image quality at each focal length. Conventional zoom lenses achieve different focal lengths, but comprise on image quality.

In addition, cameras that are used during the day and at night have been in greater demand. The lenses of the cameras must operate for both visible light and infrared light. Conventional zoom lenses have been designed for use in the visible light region, but generate chromatic aberrations near the infrared region. This causes images to not be focused when imaging at night using the infrared region.

Therefore, there is a demand for zoom lens suitable for large sensors, for example a sensor with an image circle equal or larger than 8 mm, with favourable image quality while also achieving a high zoom ratio, and operating both in the visible light region and the infrared region.

SUMMARY OF THE INVENTION

The invention is directed to a zoom lens having advantages of a large aperture, a high zoom ratio, favourable imaging quality, or being infrared confocal.

Other objects and advantages of the invention can be further illustrated by the technical features broadly embodied and described as follows.

In order to achieve one or a part of or all of the above advantages or other advantages, an embodiment of the invention provides a zoom lens arranged along an optical axis. The zoom lens includes a first lens group and a second lens group. The second lens group has at least one aspheric lens with an abbe number greater than 71.5 and two cemented surfaces. A zoom ratio of the zoom lens is greater than 1.

One embodiment of the invention also provides a zoom lens arranged along an optical axis. The zoom lens includes a first lens group and a second lens group. The second lens group has at least three lenses and two cemented surfaces. One of the at least three lenses is an aspheric lens with an abbe number greater than 71.5. The first lens group and the second lens group move with respect to each other and the zoom lens has more than one magnification.

Another embodiment of the invention also provides a zoom lens arranged along an optical axis. The zoom lens includes a first lens group and a second lens group. The second lens group has at least one aspheric lens. The first lens group and the second lens group move with respect to each other and the zoom lens has more than one magnification. A total length of the zoom lens in a wide end divided by an image height of the zoom lens is between 11.5 and 16.25, and an image height of the zoom lens is between four millimeters and ten millimeters.

In summary, the zoom lens according to the embodiments of the invention is provided with the first lens group and the second lens group. The second lens group of the zoom lens has at least one aspheric lens. Accordingly, the zoom lens according to embodiment of the invention can provide a high zoom ratio, favourable imaging quality, being infrared confocal, and a large aperture.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, may serve to explain the principles of the invention.

FIG. 1A to FIG. 1B are schematic diagrams illustrating a zoom lens according to an embodiment of the invention with a focal length respectively at a wide-end and a tele-end.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B"

component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
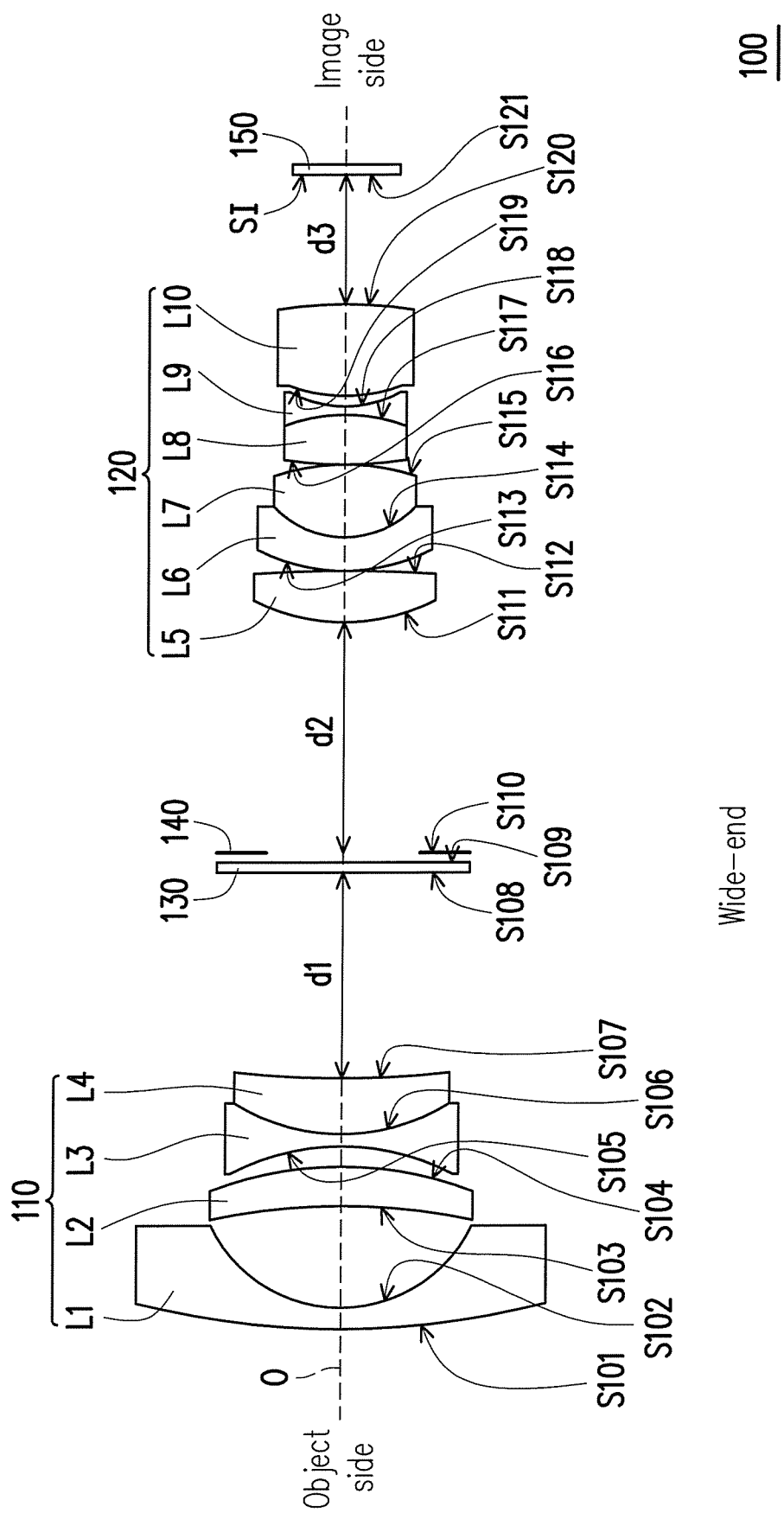

FIG. 1A to FIG. 1B are schematic diagrams illustrating a zoom lens 100 according to an embodiment of the invention with a focal length respectively at a wide-end and a tele-end. Referring to FIG. 1A and FIG. 1B, in the embodiment, the zoom lens 100 includes a first lens group 110 and a second lens group 120 respectively arranged in sequence from an object side to an image side. The term "lens group" is not meant to be limiting, but is used for the convenience of description. Unless otherwise specified in the claims, the "lens group" should not be constructed to limit the way of grouping. The zoom lens 100 has an optical axis O. The first lens group 110 has a negative refractive power and includes a first lens L1, a second lens L2, a third lens L3, and a fourth lens L4 arranged in sequence from the object side to the image side. The refractive powers of the lenses L1, L2, L3 and L4 are respectively negative, positive, negative, and positive. The second lens group 120 has a positive refractive power and is disposed between the first lens group 110 and the image side. The second lens group 120 includes a fifth lens L5, a sixth lens L6, a seventh lens L7, an eighth lens L8, a ninth lens L9, and a tenth lens L10 arranged in sequence from the object side to the image side. The refractive powers of the lenses L5, L6, L7, L8, L9 and L10 are respectively positive, negative, positive, positive, negative, and positive.

Furthermore, in the embodiment, an infrared (IR) cut filter 130 can be disposed between the first lens group 110 and the second lens group 120. The IR cut filter 130 can absorb or reflect infrared light, so that infrared light does not pass through the IR cut filter 130. This way, infrared light is unable to form an image on the image side. In the embodiment, when the zoom lens 100 is used during the day, the IR cut filter 130 is disposed in the zoom lens 100 so that infrared light does not pass through. When the zoom lens 100 is used during the night, the IR cut filter 130 can be disabled or removed from the zoom lens 100. However, the IR cut filter is not a necessary element and can be omitted under some circumstances.

An aperture stop 140 can be disposed between the IR cut filter 130 and the second lens group 120. An image sensing element 150 can be disposed on the image side, in which a surface S121 is an imaging surface SI of the image sensing element 150. In the embodiment, the image sensing element 150 is, for example, a charge coupled device (CCD) or a complementary metal oxide semiconductor (CMOS) image sensing element.

In the embodiment, the first lens group 110 is suitable to move towards the image side and the second lens group 120 is suitable to move away from the image side for the zoom lens 100 to zoom between the wide-end and the tele-end. When changing between the wide-end and the tele-end, the first lens group 110 is suitable to be moved toward the object side or the image side for focusing, and the second lens group 120 is suitable to be moved toward the object side or the image side for zooming.

A distance d1 along the optical axis O between the first lens group 110 and the IR cut filter 130, a distance d2 along the optical axis O between the aperture stop 140 and the second lens group 120, and a distance d3 between the second lens group 120 and the image sensing element 150 are variable.

More specifically, as shown in FIG. 1A and FIG. 1B, when the first lens group 110 and the second lens group 120 are moving towards each other, the zoom lens 100 switches from the wide-end to the tele-end. In this case, the distance d1 and the distance d2 become smaller, and the distance d3 becomes greater, so that the focal length of the zoom lens 100 changes from the wide-end (as shown in FIG. 1A) to the tele-end (as shown in FIG. 1B). On the contrary, when the first lens group 110 and the second lens group 120 are moving away from each other, the zoom lens 100 switches from the tele-end to the wide-end. In this case, the distance d1 and the distance d2 become greater, and the distance d3 becomes smaller, so that the focal length of the zoom lens 100 changes from the tele-end (as shown in FIG. 1B) to the wide-end (as shown in FIG. 1A).

In the embodiment, the IR cut filter 130 and the aperture stop 140 remain fixed between the first lens group 110 and the second lens group 120. In other words, during a zooming process of the zoom lens 100, the IR cut filter 130 and the aperture stop 140 remain fixed. In addition, an aperture size of the aperture stop 140 remains unchanged.

Detailed description is provided below as to further explain materials and lens structures of the zoom lens 100.

In the zoom lens 100 as described above, each of the lenses L1, L2, L3 and L4 of the first lens group 110 is, for example, a spherical lens. Each of the lenses L6, L7, L8 and L9 of the second lens group 120 is, for example a spherical lens. At least one of the fifth lens L5 and the tenth lens L10 in the second lens group 120 is an aspheric lens. In the embodiment, the lenses L5 and L10 are both aspheric lenses, and each of the lenses L1, L2, L3, L4, L6, L7, L8, and L9 is a spherical lens, but the invention is not limited thereto. Since the lenses L5 and L10 are aspheric lenses, an f-number of the zoom lens 100 can be as small as f/1.80, thereby achieving a large aperture. The f-number may fall in the range of 1.4 to 1.7, or 1.5 to 1.6.

More specifically, in the embodiment, the first lens L1 is a convex-concave lens with a convex surface facing the object side. The second lens L2 is a concave-convex lens with a concave surface facing the object side. The third lens L3 is a biconcave lens. The fourth lens L4 is a concave-convex lens with a convex surface facing the object side. The fifth lens L5 is a biconvex lens. The sixth lens L6 is a convex-concave lens with a convex surface facing the object side. The seventh lens L7 is a biconvex lens. The eighth lens L8 is a biconvex lens. The ninth lens L9 is a biconcave lens. The tenth lens L10 is a biconvex lens. Furthermore, as shown in FIG. 1A, in the embodiment, the third lens L3 and the fourth lens L4 of the first lens group 110 form a double cemented lens. The sixth lens L6 and the seventh lens L7 of the first lens group 110 form a double cemented lens. The eighth lens L8 and the ninth lens L9 form a double cemented lens. In the embodiment a cemented lens is defined as lenses that are adhered together without a gap in between.

Since commonly a lens may generate a dispersion from different wavelengths of light, thus, for example, a blue light and a red light cannot be focused on a plane within the same distance, thereby causing a chromatic aberration. In order to solve the chromatic aberration as mentioned above, in the embodiment, at least one positive lens in the second lens group 120 is, for example, an extra low dispersion lens. That is to say, an abbe number of an extra low dispersion lens is, for example, greater than 45, but the invention is not limited thereto. Specifically, in the embodiment, the fifth lens L5, the seventh lens L7 and the tenth lens L10 each have an abbe number greater than 45. In this embodiment, the tenth lens L10 is an aspheric glass lens with an abbe number of 81.6. However, the invention is not limited thereto. The abbe number of the tenth lens L10 can be greater than 71.5. Preferably, the abbe number can be greater than 75. In other words, in the embodiment, the material of the lenses having a high abbe number is a material of extra low dispersion. In this embodiment, the material is glass. Accordingly, the zoom lens 100 can also have favourable effect of aberration correction so as to provide a more preferable imaging quality. In addition, the zoom lens 100 can achieve being infrared confocal, so as to achieve clear imaging during the day and during the night.

An embodiment of the zoom lens 100 is described below. However, the invention is not limited to the data listed below. It should be known to those ordinary skilled in the art that various modifications and variations can be made to the structure of the present invention without departing from the scope or spirit of the invention after referring to the invention.

"Abbe number" corresponding to each of the lenses listed in the "Lens number" column can be found in the corresponding values for the distance, refractive index, semi-diameter, and abbe number from each row. Furthermore, the "Lens number" column shows if the lens is spherical or aspherical. In addition, the surface S101 is a surface of the first lens L1 facing the object side, and the surface S102 is a surface of the first lens L1 facing the image side. The surfaces S103 and S104 are the two surfaces of the second lens L2. The surface S105 is the a surface of the third lens L3 facing the object side, the surface S106 is the surface of the third lens L3 contacting the fourth lens L4, and the surface S107 is the surface of the fourth lens L4 facing the image side. The surfaces S108 and S109 are the two surfaces of the IR cut filter 130. The aperture stop 140 has the surface S110. The surfaces S111 and S112 are the two surfaces of the fifth lens L5. The surface S113 is the a surface of the sixth lens L6 facing the object side, the surface S114 is the surface of the sixth lens L6 contacting the seventh lens L7, and the surface S115 is the surface of the seventh lens L7 facing the image side. The surface S116 is the a surface of the eighth lens L8

TABLE 1A

| Surface | Radius of Curvature (mm) | Distance (mm) | Refractive Index | Abbe Number | Semi-Diameter (mm) | Lens number, (refractive power) | Notes (shape) |
|---|---|---|---|---|---|---|---|
| S101 | 42.3 | 1.0 | 1.9 | 31.3 | 12.3 | L1, (−), spherical | convex |
| S102 | 8.5 | 5.8 | | | 7.9 | | concave |
| S103 | −42.6 | 2.5 | 1.8 | 25.4 | 8.0 | L2, (+), spherical | concave |
| S104 | −21.4 | 1.1 | | | 7.8 | | convex |
| S105 | −15.1 | 0.8 | 1.6 | 58.2 | 7.3 | L3, (−), spherical | concave |
| S106 | 11.0 | 3.5 | 1.8 | 25.4 | 6.9 | L4, (+), spherical | convex |
| S107 | 85.9 | d1 | | | 6.7 | | concave |
| S108 | INF | 0.1 | 1.5 | 64.2 | 4.7 | | Infrared cut filter (130) |
| S109 | | 0.1 | | | 4.6 | | |
| S110 | | d2 | | | 4.6 | | Aperture Stop (140) |
| S111 | 10.1 | 3.1 | 1.6 | 59.2 | 5.4 | L5, (+), aspheric | convex |
| S112 | −46.6 | 0.2 | | | 5.2 | | convex |
| S113 | 12.5 | 1.5 | 1.8 | 25.4 | 4.9 | L6, (−), spherical | convex |
| S114 | 6.7 | 4.6 | 1.4 | 94.9 | 4.6 | L7, (+), spherical | convex |
| S115 | −14.3 | 0.2 | | | 4.6 | | convex |
| S116 | 20.8 | 2.5 | 1.9 | 20.9 | 4.5 | L8, (+), spherical | convex |
| S117 | −14.8 | 0.5 | 1.9 | 23.8 | 4.3 | L9, (−), spherical | concave |
| S118 | 7.0 | 1.1 | | | 3.9 | | concave |
| S119 | 11.9 | 3.5 | 1.5 | 81.6 | 3.9 | L10, (+), aspheric | Convex |
| S120 | INF | d3 | | | 4.4 | | Convex |
| S121 | INF INF | 0.5 | 1.5 | 64.2 | 4.5 | | Cover glass Image Sensing Element (150) |

In Table 1A, "Radius of Curvature" refers to a radius of curvature of each surface, and "Distance" refers to a distance between two adjacent surfaces along the optical axis O. For instance, "Distance" for the surface S101 is a distance from the surface S101 to the surface S102 on the optical axis O. "Semi-diameter", "Thickness", "Refractive Index", and facing the object side, the surface S117 is the surface of the eighth lens L8 contacting the ninth lens L9, and the surface S118 is the surface of the ninth lens L9 facing the image side. The surfaces S119 and S120 are the two surfaces of the tenth lens L10. The surface S121 is the imaging surface SI of the image sensing element 150.

It should be noted that the zoom lens 100 are adapted to satisfy the requirements that the diameter of the connection surface is larger than or equal to 14 millimetres millimeters (phi 14), which is where the lens is disposed relative to the image sensing element 150.

In view of the above, the surfaces S111, S112, S119 and S120 are of aspheric surfaces, and a formula of the aspheric surfaces is defined as follows (Formula 1).

$$Z = \frac{(1/R)H^2}{1+\sqrt{1-(1+K)(H/R)^2}} + AH^4 + BH^6 + CH^8 + DH^{10}$$

Therein, Z is a sag along a direction of the optical axis O. R is a radius of osculating sphere, which is also the radius of curvature near the optical axis O (the radius of curvatures for the S111, S112, S119 and S120 in Table 1). K is a conic constant. H is an aspheric height, which is a height from a center of the lens to an edge of the lens. In view of the formula, it can be known that different values of H are corresponding to different values of Z. A, B, C, and D are aspheric coefficients. The aspheric coefficients and K values of the surfaces S111, S112, S119 and S120 are as shown in Table 2A.

TABLE 2A

| Surface | K | A | B | C | D |
| --- | --- | --- | --- | --- | --- |
| S111 | 0 | −1.2E−04 | 1.5E−04 | −5.2E−04 | −5.5E−04 |
| S112 | 0 | 1.6E−06 | 2.2E−06 | −3.0E−05 | −1.9E−05 |
| S119 | 0 | −4.1E−08 | −6.4E−08 | 7.9E−07 | −3.5E−07 |
| S120 | 0 | −8.4E−10 | −7.0E−10 | −7.1E−08 | 4.0E−09 |

Table 3A includes the variable distances d1, d2, and d3 of when the zoom lens 100 is at the wide-end and the tele-end. Due to the lens arrangement of the zoom lens 100, a zoom ratio of the zoom lens 100 can be greater than 2.4, so as to achieve a large zoom ratio. The zoom ratio may fall in the range of 2.5 to 3, or 2.6-2.8. In the embodiment, an effective focal length of the zoom lens 100 in the wide-end is 3.85 mm, and in the tele-end is 10 mm. The effective focal length ratio, or the zoom ratio, of the zoom lens 100 is the effective focal length of the tele-end divided by the wide-end, or 2.60.

Furthermore, a focal length of first lens group 110 is −9.2 mm, a focal length of the second lens group 120 is 10.7 mm. A total length of the zoom lens 100 in the wide-end is 54.7 mm. A total length in the wide-end of the zoom lens 100 is the distance from the surface S101 of the first lens L1 to the surface S121 of the image sensing element 150. Referring to Table 1A, the total length in the wide-end of the zoom lens is S101(1.0 mm)+S102(5.8 mm)+ . . . +S121(0.5).

An f-number of the zoom lens 100 is 1.50. After light passes through the last lens of the zoom lens 100, an image is formed on the image side and the height of the image is greater than or equal to 4 mm. An object of the zoom lens 100 and an image of the zoom lens 100 are around the optical axis O. The image is formed in, for example, an image circle, and the optical axis is the center of the image circle. Generally, an image height is half of the diameter of the image circle. Preferably, the image height may be between 4 mm to 10 mm, and more preferably between 4 mm and 6 mm. In the embodiment, a total length in the wide-end of the zoom lens divided by the image height is between 11.5 and 16.25, preferably between 12.75 and 15.25, and more preferably between 13.75 and 15.

TABLE 3A

| | | Wide-end | Tele-end |
| --- | --- | --- | --- |
| Variable | d1 | 10.2 | 1.6 |
| Distance (mm) | d2 | 8.0 | 0.9 |
| | d3 | 3.9 | 11.1 |

In the following embodiments detailed description of the zoom lens can be referred to in the tables of each embodiment. The tables below are similar to the tables describing the zoom lens 100. In addition, the operation and arrangement of the zoom lens of the following embodiments are also similar to the embodiment of the zoom lens 100. Therefore, similar features and descriptions to the embodiment of the zoom lens 100 will not be repeated hereafter.

Figure 2A:
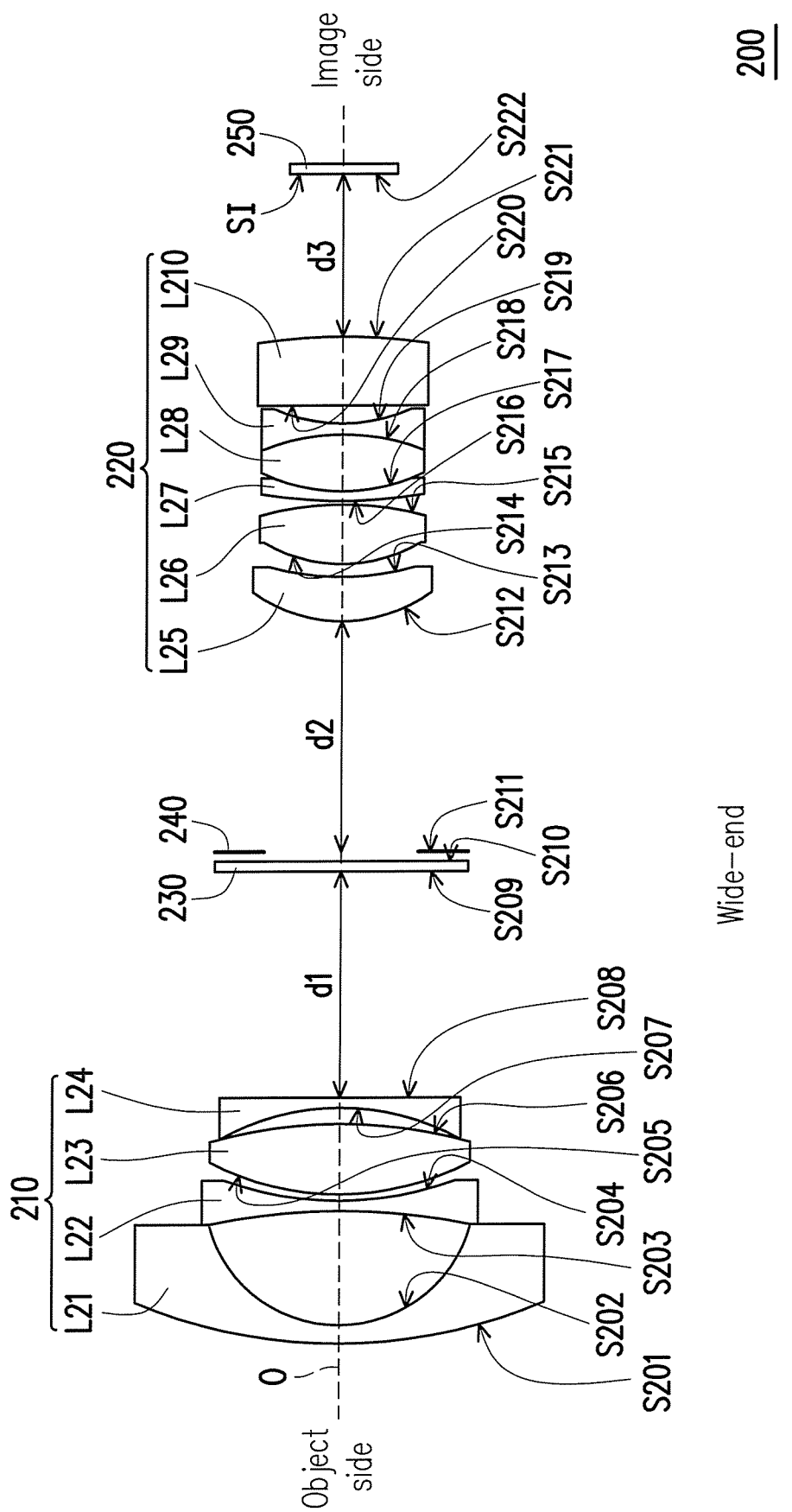
FIG. 2A to FIG. 2B are schematic diagrams illustrating a zoom lens according to another embodiment of the invention with a focal length respectively at the wide-end and the tele-end.
Figure 2B:
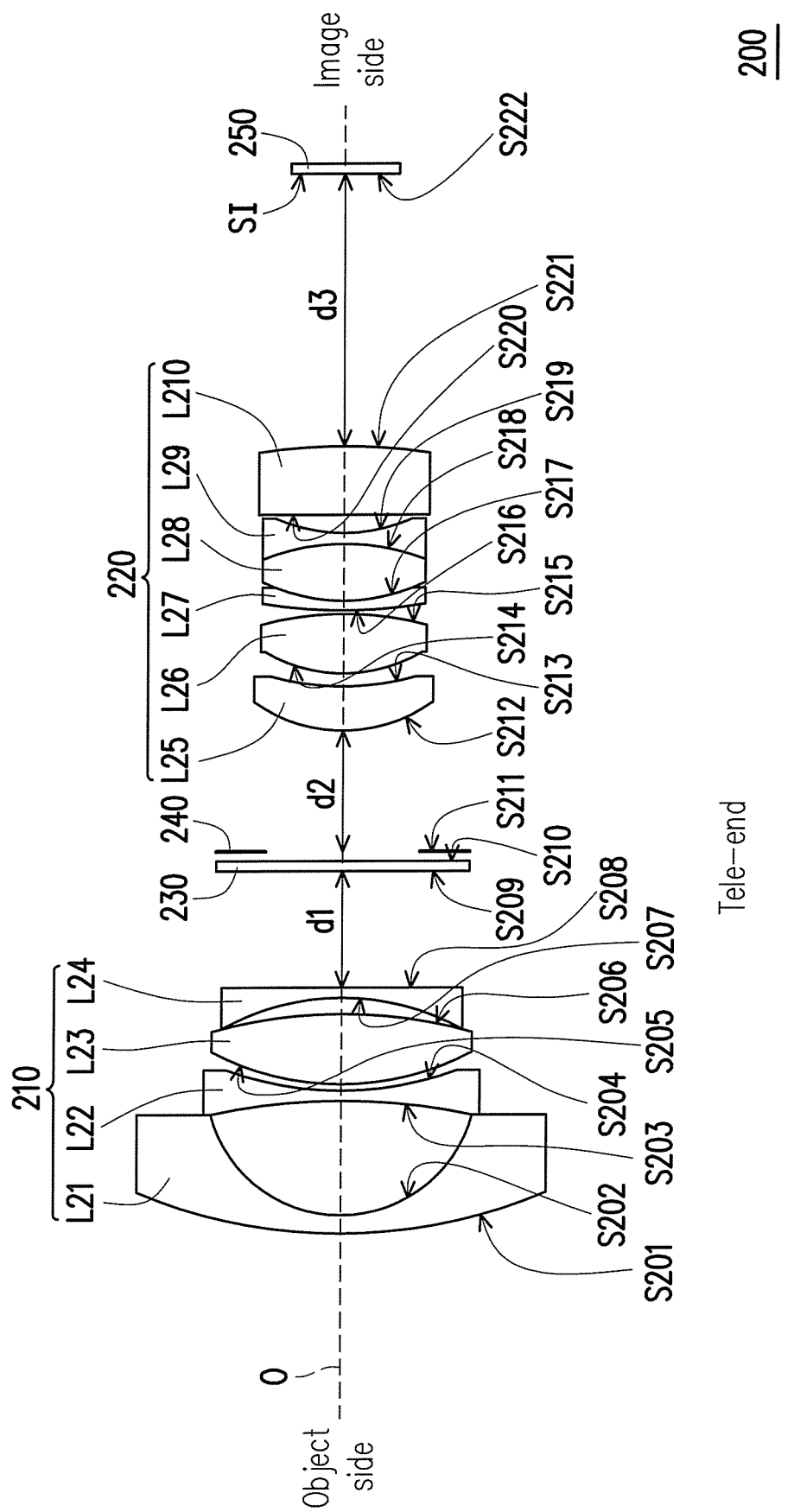

FIG. 2A to FIG. 2B are schematic diagrams illustrating a zoom lens according to another embodiment of the invention with a focal length respectively at the wide-end and the tele-end. Referring to FIG. 2A and FIG. 2B, in the embodiment, the zoom lens 200 includes a first lens group 210 and a second lens group 220 respectively arranged in sequence from an object side to an image side. The zoom lens 200 has an optical axis O. The first lens group 210 has a negative refractive power and includes a first lens L21, a second lens L22, a third lens L23, and a fourth lens L24 arranged in sequence from the object side to the image side. The second lens group 220 has a positive refractive power and includes a fifth lens L25, a sixth lens L26, a seventh lens L27, an eighth lens L28, a ninth lens L29, and a tenth lens L210 arranged in sequence from the object side to the image side.

In the embodiment, since the fifth lens L25 and the tenth lens L210 are aspheric lenses, an f-number of the zoom lens 200 can be as small as f/1.80, thereby achieving a large aperture. The f-number may fall in the range of 1.4 to 1.7, or 1.5 to 1.6.

Furthermore, as shown in FIG. 2A, in the embodiment, the seventh lens L27, the eighth lens L28, and the ninth lens L29 of the second lens group 220 form a triple cemented lens.

An embodiment of the zoom lens 200 is described below. However, the invention is not limited to the data listed below.

TABLE 1B

| Surface | Radius of Curvature (mm) | Distance (mm) | Refractive Index | Abbe Number | Semi-Diameter (mm) | Lens number, (refractive power) | Notes (shape) |
| --- | --- | --- | --- | --- | --- | --- | --- |
| S201 | 31.5 | 1.1 | 1.9 | 32.1 | 11.8 | L21, (−), spherical | convex |
| S202 | 8.5 | 5.9 | | | 7.8 | | concave |
| S203 | −37.8 | 0.7 | 1.9 | 40.9 | 7.7 | L22, (−), spherical | concave |

TABLE 1B-continued

| Surface | Radius of Curvature (mm) | Distance (mm) | Refractive Index | Abbe Number | Semi-Diameter (mm) | Lens number, (refractive power) | Notes (shape) |
|---|---|---|---|---|---|---|---|
| S204 | 20.8 | 0.4 | | | 7.3 | | concave |
| S205 | 17.3 | 4.5 | 1.8 | 22.8 | 7.3 | L23, (+), spherical | convex |
| S206 | −28.9 | 0.9 | | | 6.9 | | convex |
| S207 | −15.4 | 0.7 | 1.6 | 66.5 | 6.8 | L24, (−), spherical | concave |
| S208 | −814.2 | d1 | | | 6.4 | | convex |
| S209 | INF | 0.1 | 1.5 | 64.2 | 4.0 | | Infrared cut filter (230) |
| S210 | | 0.3 | | | 4.0 | | |
| S211 | | d2 | | | 4.0 | | Aperture Stop (240) |
| S212 | 9.5 | 2.8 | 1.6 | 62.2 | 5.2 | L25, (+), aspheric | convex |
| S213 | 26.1 | 0.8 | | | 4.8 | | concave |
| S214 | 9.8 | 3.6 | 1.4 | 94.9 | 4.8 | L26, (+), spherical | convex |
| S215 | −21.2 | 0.2 | | | 4.7 | | convex |
| S216 | 26.2 | 0.7 | 1.8 | 25.6 | 4.6 | L27, (−), spherical | convex |
| S217 | 12.0 | 3.4 | 1.8 | 46.8 | 4.4 | L28, (+), spherical | convex |
| S218 | −14.0 | 0.7 | 1.8 | 26.7 | 4.1 | L29, (−), spherical | concave |
| S219 | 10.9 | 1.0 | | | 3.8 | | concave |
| S220 | 26.0 | 4.3 | 1.8 | 23.7 | 3.9 | L210, (+), aspheric | convex |
| S221 | 172.2 | d3 | | | 4.2 | | concave |
| S222 | INF INF | 0.5 | 1.5 | 64.2 | 4.3 | | Cover glass Image Sensing Element (250) |

In view of above, the surfaces S212, S213, S220 and S221 are of aspheric surfaces, and a formula of the aspheric surfaces is defined as Formula 1 in the embodiment of the zoom lens 100. The aspheric coefficients and K values of the surfaces S212, S213, S220 and S221 are as shown in Table 2B.

TABLE 2B

| Surface | K | A | B | C | D |
|---|---|---|---|---|---|
| S212 | 0 | 8.0E−05 | 3.7E−04 | −6.8E−04 | −3.4E−04 |
| S213 | 0 | 2.6E−06 | 5.7E−06 | −2.0E−05 | −1.1E−05 |
| S220 | 0 | −5.2E−08 | −9.8E−08 | −7.9E−08 | 4.7E−09 |
| S221 | 0 | 1.9E−09 | 4.5E−09 | −2.7E−08 | 4.3E−09 |

Table 3B includes the variable distances d1, d2, and d3 of when the zoom lens 200 is at the wide-end and the tele-end. A zoom ratio of the zoom lens 200 can be greater than 2.4, so as to achieve a large zoom ratio. The zoom ratio may fall in the range of 2.5 to 3, or 2.6-2.8. In the embodiment, An effective focal length of the zoom lens 200 in the wide-end is 3.90 mm, and in the tele-end is 10.14 mm. The effective focal length ratio, or the zoom ratio, of the zoom lens 200 is the effective focal length of the tele-end divided by the wide-end, or 2.60.

Furthermore, a focal length of first lens group 210 is −9.5 mm, a focal length of the second lens group 220 is 10.5 mm. A total length of the zoom lens 200 in the wide-end is 54.6 mm. A total length in the wide-end of the zoom lens 200 is calculated in the same way as the zoom lens 100, and will not be described again herein.

An f-number of the zoom lens 100 is 1.50. After light passes through the last lens of the zoom lens 200, an image is formed on the image side and the height of the image is greater than or equal to 4 mm. An object of the zoom lens 200 and an image of the zoom lens 200 are around the optical axis O. The image is formed in, for example, an image circle, and the optical axis is the center of the image circle. Generally, an image height is half of the diameter of the image circle. Preferably, the image height may be between 4 mm to 10 mm, and more preferably between 4 mm and 7 mm. In the embodiment, a total length in the wide-end of the zoom lens divided by the image height is between 11.5 and 16.25, preferably between 12.75 and 15.25, and more preferably between 13.75 and 15.

TABLE 3B

| | | Wide-end | Tele-end |
|---|---|---|---|
| Variable Distance (mm) | d1 | 10.8 | 2.0 |
| | d2 | 7.0 | 0.1 |
| | d3 | 4.2 | 11.1 |

Figure 3A:
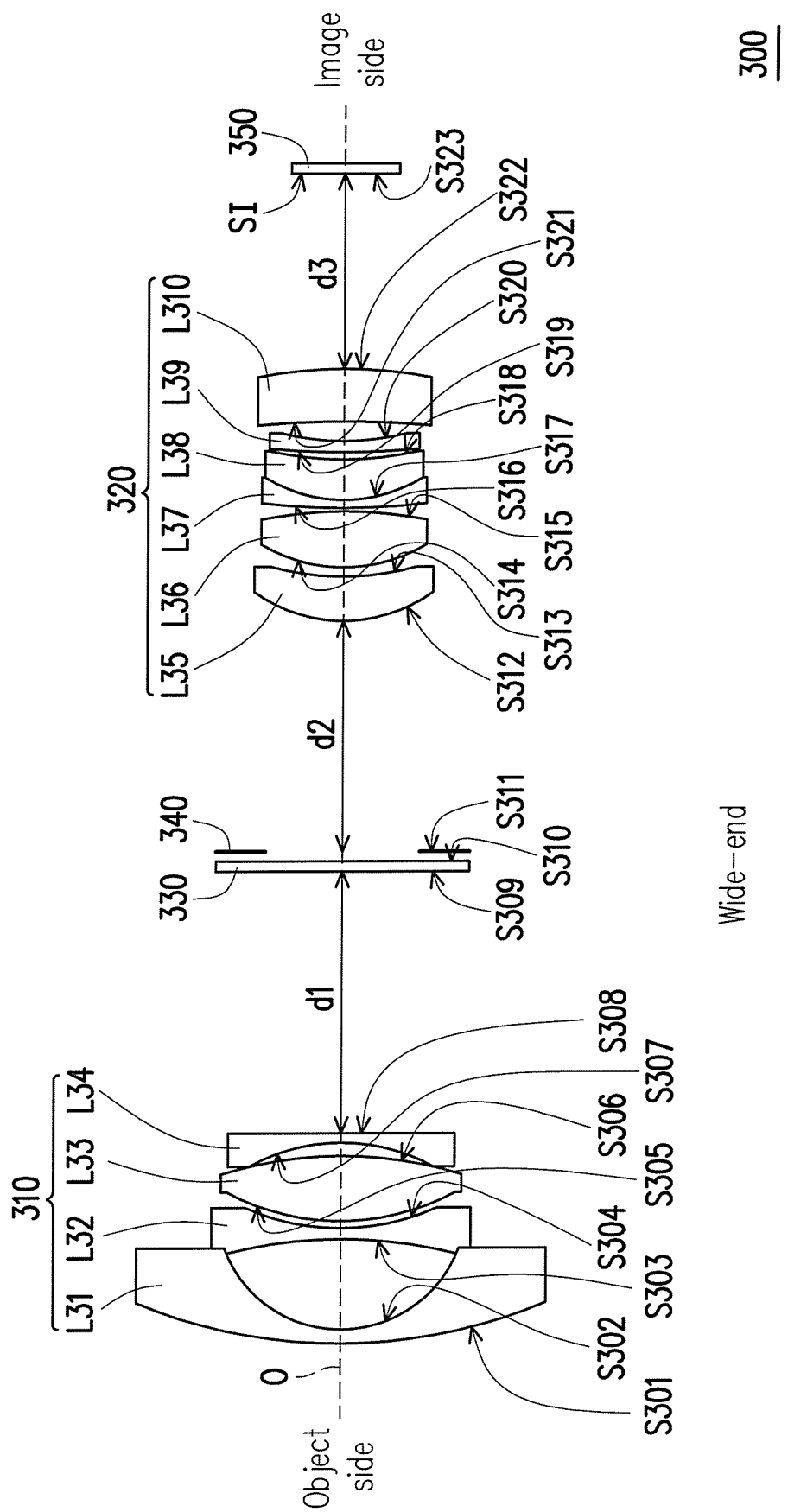
FIG. 3A to FIG. 3B are schematic diagrams illustrating a zoom lens according to another embodiment of the invention with a focal length respectively at the wide-end and the tele-end.
Figure 3B:
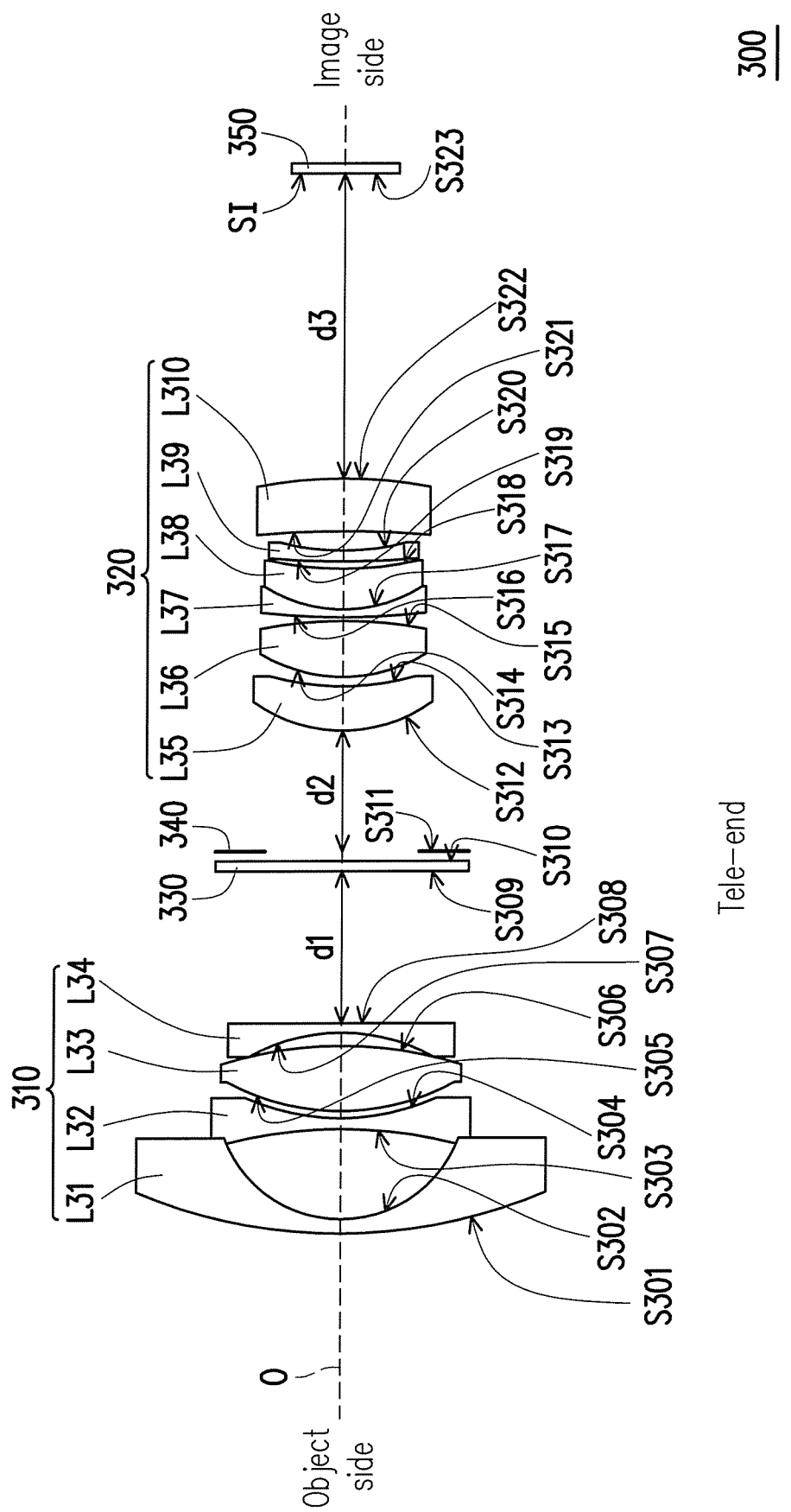

FIG. 3A to FIG. 3B are schematic diagrams illustrating a zoom lens according to another embodiment of the invention with a focal length respectively at the wide-end and the tele-end. In the embodiment of FIGS. 3A and 3B, similar elements to the embodiment in FIGS. 1A and 1B will use same or similar reference numerals. Referring to FIG. 3A and FIG. 3B, in the embodiment, the zoom lens 300 includes a first lens group 310 and a second lens group 320 respectively arranged in sequence from an object side to an image side. The zoom lens 300 has an optical axis O. The first lens group 310 has a negative refractive power and includes a first lens L31, a second lens L32, a third lens L34, and a fourth lens L34 arranged in sequence from the object side to the image side. The second lens group 320 has a positive refractive power and includes a fifth lens L35, a sixth lens L36, a seventh lens L37, an eighth lens L38, a ninth lens L39, and a tenth lens L310 arranged in sequence from the object side to the image side.

Since the fifth lens L35 and the tenth lens L310 are aspheric lenses, an f-number of the zoom lens 300 can be as small as f/1.80, thereby achieving a large aperture. The f-number may fall in the range of 1.4 to 1.7, or 1.5 to 1.6. Furthermore, as shown in FIG. 3A, in the embodiment, the seventh lens L37 and the eighth lens L38 of the second lens group 320 form a double cemented lens.

An embodiment of the zoom lens 300 is described below. However, the invention is not limited to the data listed below.

zoom lens 100. The aspheric coefficients and K values of the surfaces S312, S313, S321 and S322 are as shown in Table 2C.

TABLE 2C

| Surface | K | A | B | C | D |
|---|---|---|---|---|---|
| S312 | 0 | 5.8E−05 | 3.3E−04 | −8.0E−04 | −4.3E−04 |
| S313 | 0 | 2.0E−06 | 4.9E−06 | −2.2E−05 | −1.4E−05 |
| S321 | 0 | −3.8E−08 | −7.8E−08 | −1.5E−07 | 1.8E−08 |
| S322 | 0 | 1.6E−09 | 3.8E−09 | −2.8E−08 | 5.5E−09 |

Table 3C includes the variable distances d1, d2, and d3 of when the zoom lens 300 is at the wide-end and the tele-end. A zoom ratio of the zoom lens 300 can be greater than 2.4, so as to achieve a large zoom ratio. The zoom ratio may fall in the range of 2.5 to 3, or 2.6-2.8. In the embodiment, an effective focal length of the zoom lens 300 in the wide-end is 3.7 mm, and in the tele-end is 9.62 mm. The effective focal length ratio, or the zoom ratio, of the zoom lens 300 is the effective focal length of the tele-end divided by the wide-end, or 2.60.

TABLE 1C

| Surface | Radius of Curvature (mm) | Distance (mm) | Refractive Index | Abbe Number | Semi-Diameter (mm) | Lens number, (refractive power) | Notes (shape) |
|---|---|---|---|---|---|---|---|
| S301 | 30.7 | 1.1 | 1.9 | 32.3 | 13.0 | L31, (−), spherical | convex |
| S302 | 8.3 | 6.4 | | | 7.9 | | concave |
| S303 | −38.2 | 0.7 | 1.9 | 40.8 | 8.0 | L32, (−), spherical | concave |
| S304 | 19.8 | 0.5 | | | 7.4 | | concave |
| S305 | 16.7 | 4.6 | 1.8 | 22.7 | 7.4 | L33, (+), spherical | convex |
| S306 | −26.8 | 0.8 | | | 7.0 | | convex |
| S307 | −15.5 | 0.7 | 1.6 | 61.8 | 7.0 | L34, (−), spherical | concave |
| S308 | INF | d1 | | | 6.6 | | plane |
| S309 | INF | 0.1 | 1.5 | 64.2 | 4.3 | | Infrared cut filter (330) |
| S310 | | 0.4 | | | 4.3 | | |
| S311 | | d2 | | | 4.3 | | Aperture Stop (340) |
| S312 | 9.6 | 2.9 | 1.6 | 58.0 | 5.1 | L35, (+), aspheric | convex |
| S313 | 27.0 | 0.8 | | | 4.8 | | concave |
| S314 | 9.0 | 3.8 | 1.4 | 94.9 | 4.7 | L36, (+), spherical | convex |
| S315 | −21.0 | 0.2 | | | 4.6 | | convex |
| S316 | 36.9 | 0.7 | 1.8 | 26.2 | 4.5 | L37, (−), spherical | convex |
| S317 | 8.2 | 3.1 | 1.8 | 47.2 | 4.3 | L38, (+), spherical | convex |
| S318 | 86.5 | 0.3 | | | 4.0 | | concave |
| S319 | −198.8 | 0.7 | 1.8 | 21.8 | 4.0 | L39, (−), spherical | concave |
| S320 | 15.7 | 1.1 | | | 3.9 | | concave |
| S321 | 25.4 | 3.7 | 1.9 | 22.8 | 3.9 | L310, (+), aspheric | convex |
| S322 | 76.4 | d3 | | | 4.2 | | concave |
| S323 | INF INF | 0.5 | 1.5 | 64.2 | 4.4 | | Cover glass Image Sensing Element (350) |

In view of above, the surfaces S312, S313, S321 and S322 are of aspheric surfaces, and a formula of the aspheric surfaces is defined as Formula 1 in the embodiment of the Furthermore, a focal length of first lens group 310 is −9.03 mm, a focal length of the second lens group 320 is 10.4 mm. A total length of the zoom lens 300 in the wide-end is 55 mm. A total length in the wide-end of the zoom lens 300 is calculated in the same way as the zoom lens 100, and will not be described again herein.

An f-number of the zoom lens 300 is 1.50. After light passes through the last lens of the zoom lens 300, an image is formed on the image side and the height of the image is greater than or equal to 4 mm. Preferably, the image height may be between 4 mm to 10 mm, and more preferably between 4 mm and 5 mm. In the embodiment, a total length in the wide-end of the zoom lens divided by the image height is between 11.5 and 16.25, preferably between 12.75 and 15.25, and more preferably between 13.75 and 15.

TABLE 3C

|  |  | Wide-end | Tele-end |
|---|---|---|---|
| Variable | d1 | 10.8 | 2.0 |
| Distance (mm) | d2 | 6.9 | 0.1 |
|  | d3 | 4.2 | 11.0 |

Figure 4A:
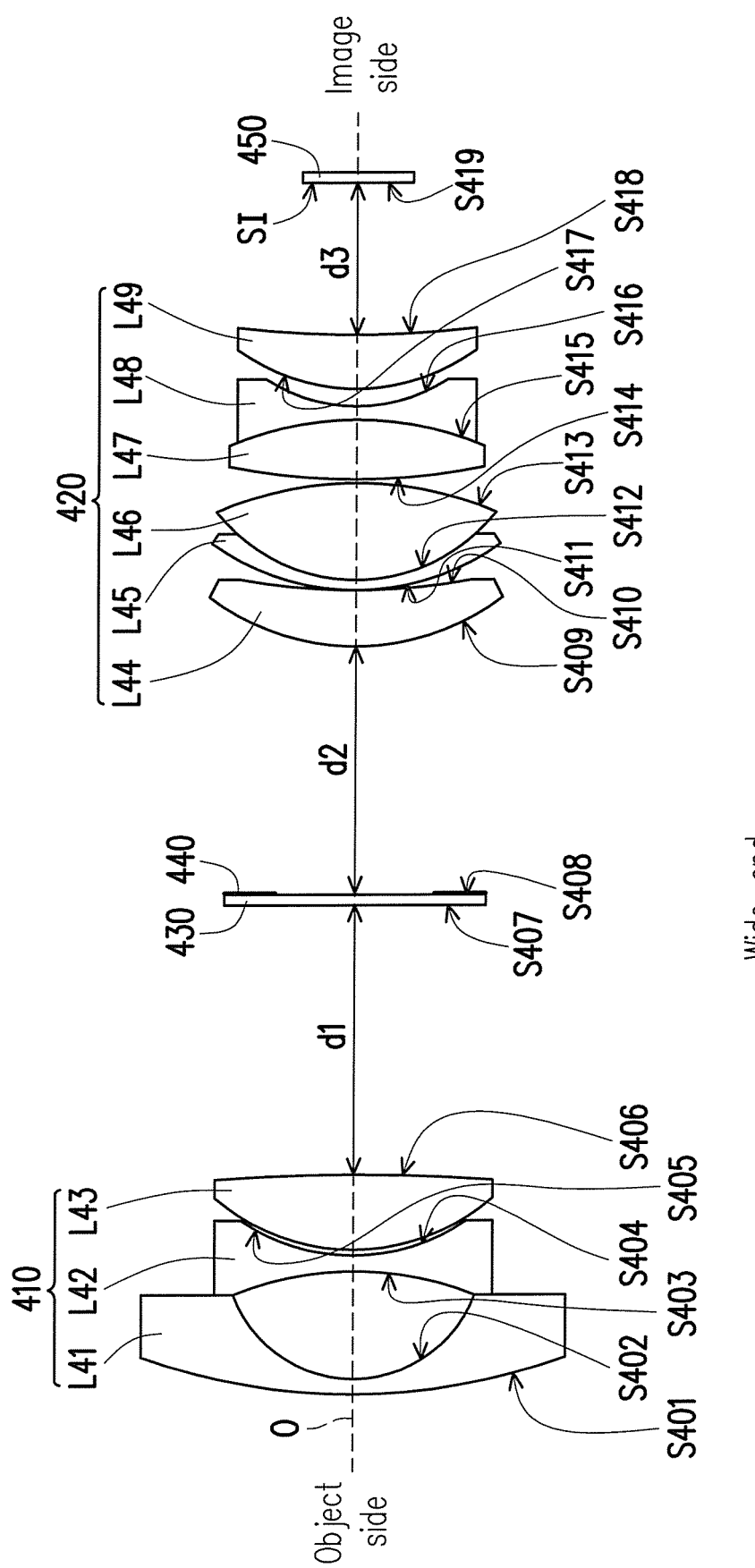
FIG. 4A to FIG. 4B are schematic diagrams illustrating a zoom lens according to another embodiment of the invention with a focal length respectively at the wide-end and the tele-end.
Figure 4B:
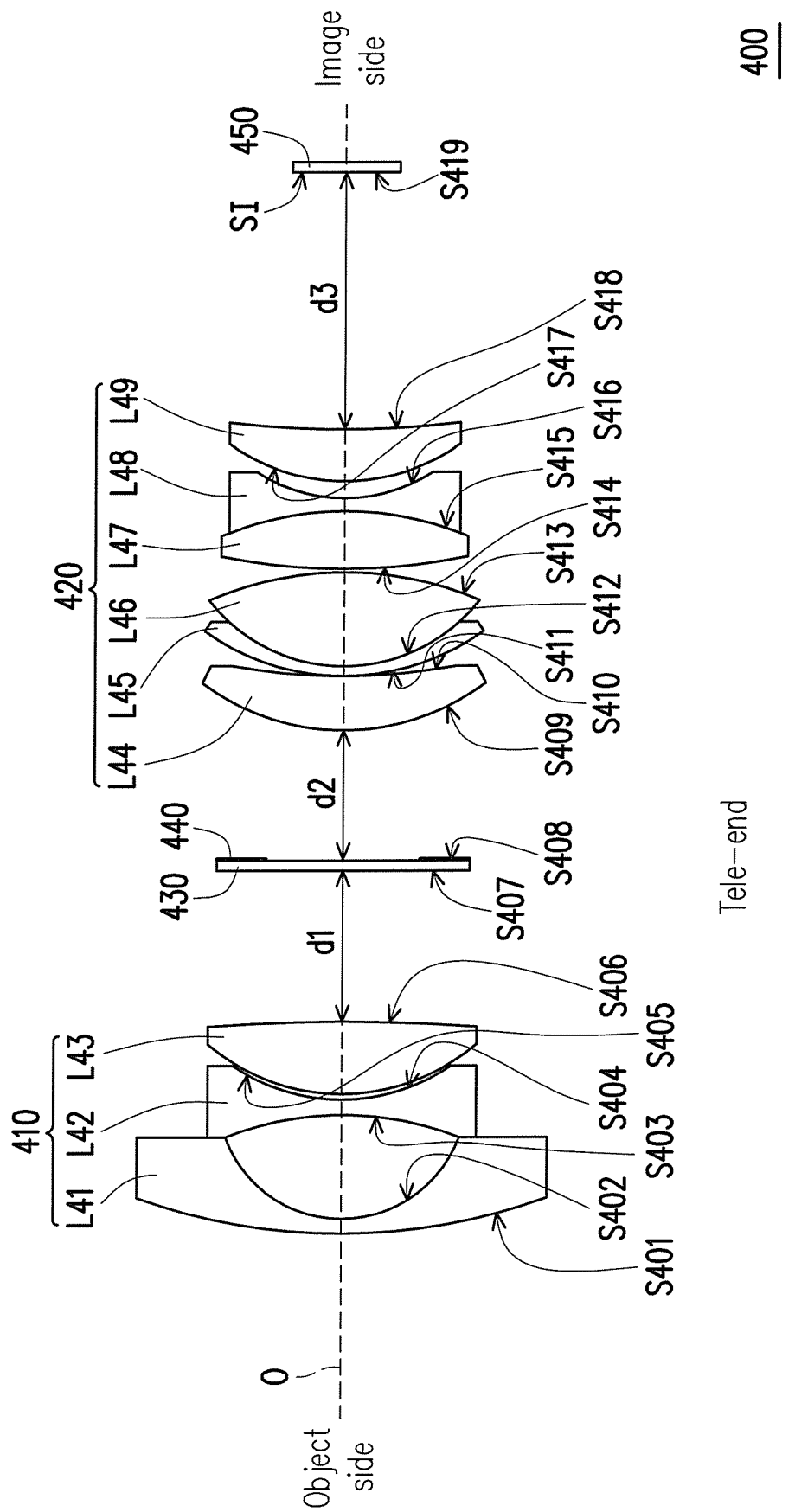

FIG. 4A to FIG. 4B are schematic diagrams illustrating a zoom lens according to another embodiment of the invention with a focal length respectively at the wide-end and the tele-end. In the embodiment of FIGS. 4A and 4B, similar elements to the embodiment in FIGS. 1A and 1B will use same or similar reference numerals. Referring to FIG. 4A and FIG. 4B, in the embodiment, the zoom lens 400 includes a first lens group 410 and a second lens group 420 respectively arranged in sequence from an object side to an image side. The zoom lens 400 has an optical axis O. The first lens group 410 has a negative refractive power and includes a first lens L41, a second lens L42, and a third lens L43 arranged in sequence from the object side to the image side. The second lens group 420 has a positive refractive power and includes a fourth lens L44, a fifth lens L45, a sixth lens L46, a seventh lens L47, an eighth lens L48, and a ninth lens L49 arranged in sequence from the object side to the image side.

In the embodiment, operational mechanisms (i.e. zooming and focusing process) of the zoom lens 200, 300, 400 are similar to operational mechanisms of the zoom lens 100, and similar details can refer to above paragraphs, thus related description is omitted hereinafter.

Since the fourth lens 421 and the ninth lens 426 are aspheric lenses, an f-number of the zoom lens 400 can be as small as f/1.80, thereby achieving a large aperture. The f-number may fall in the range of 1.4 to 1.7, or 1.5 to 1.6. Furthermore, as shown in FIG. 4A, in the embodiment, the fifth lens 422 and the sixth lens 423 of the second lens group 420 form a double cemented lens. The seventh lens 424 and the eighth lens 425 of the second lens group 420 also form a double cemented lens.

An embodiment of the zoom lens 400 is described below. However, the invention is not limited to the data listed below.

TABLE 1D

| Surface | Radius of Curvature (mm) | Distance (mm) | Refractive Index | Abbe Number | Semi-Diameter (mm) | Lens number, (refractive power) | Notes (shape) |
|---|---|---|---|---|---|---|---|
| S401 | 53.5 | 0.5 | 1.8 | 49.5 | 10.6 | L41, (−), spherical | convex |
| S402 | 7.2 | 5.7 |  |  | 6.8 |  | concave |
| S403 | −23.8 | 0.5 | 1.6 | 63.3 | 6.8 | L42, (−), spherical | concave |
| S404 | 12.1 | 0.1 |  |  | 6.6 |  | concave |
| S405 | 11.3 | 3.9 | 1.7 | 28.1 | 6.7 | L43, (+), aspheric | convex |
| S406 | −98.0 | d1 |  |  | 6.6 |  | convex |
| S407 | INF | 0.1 | 1.5 | 64.2 | 4.0 |  | Infrared cut filter (430) |
| S408 |  | d2 |  |  | 4.0 |  | Aperture Stop (440) |
| S409 | 9.7 | 2.5 | 1.6 | 59.3 | 5.3 | L44, (+), aspheric | convex |
| S410 | 76.7 | 0.1 |  |  | 4.9 |  | concave |
| S411 | 8.6 | 0.5 | 1.9 | 24.2 | 4.9 | L45, (−), spherical | convex |
| S412 | 6.4 | 4.7 | 1.4 | 94.9 | 4.7 | L46, (+), spherical | convex |
| S413 | −10.5 | 0.1 |  |  | 4.7 |  | convex |
| S414 | 24.2 | 2.7 | 1.9 | 18.9 | 4.4 | L47, (+), spherical | convex |
| S415 | −11.3 | 0.5 | 1.9 | 25.5 | 4.1 | L48, (−), spherical | concave |
| S416 | 5.6 | 1.0 |  |  | 3.6 |  | concave |
| S417 | 6.5 | 2.7 | 1.5 | 81.5 | 4.1 | L49, (+), aspheric | convex |
| S418 | 40.0 | d3 |  |  | 4.2 |  | concave |
| S419 | INF | 0.5 | 1.5 | 64.2 | 4.4 |  | Cover glass Image Sensing Element (450) |

It should be noted that the zoom lens 200, 300, 400 are adapted to satisfy the requirements that the diameter of the connection surface is larger than or equal to 14 mm (phi 14), which is where the lens are disposed relative to the image sensing element 250, 350, 450, respectively.

In view of above, the surfaces S409, S410, S417 and S418 are of aspheric surfaces, and a formula of the aspheric surfaces is defined as Formula 1 in the embodiment of the zoom lens 100. The aspheric coefficients and K values of the surfaces S409, S410, S417 and S418 are as shown in Table 2D.

TABLE 2D

| Surface | K | A | B | C | D |
|---|---|---|---|---|---|
| S409 | 0 | 8.7E−05 | 5.1E−04 | −4.7E−04 | −1.5E−04 |
| S410 | 0 | 9.0E−06 | 1.6E−05 | −5.0E−06 | −9.0E−06 |
| S417 | 0 | −5.5E−08 | 8.0E−08 | | |
| S418 | 0 | 1.4E−09 | 1.9E−10 | | |

Table 3D includes the variable distances d1, d2, and d3 of when the zoom lens 400 is at the wide-end and the tele-end. A zoom ratio of the zoom lens 400 can be greater than 2.4, so as to achieve a large zoom ratio. The zoom ratio may fall in the range of 2.5 to 3, or 2.6-2.8. In the embodiment, an effective focal length of the zoom lens 400 in the wide-end is 3.87 mm, and in the tele-end is 10.74 mm. The effective focal length ratio, or the zoom ratio, of the zoom lens 400 is the effective focal length of the tele-end divided by the wide-end, or 2.78.

Furthermore, a focal length of first lens group 410 is −9.5 mm, a focal length of the second lens group 420 is 10.5 mm. A total length of the zoom lens 400 in the wide-end is 50 mm. A total length in the wide-end of the zoom lens 400 is calculated in the same way as the zoom lens 100, and will not be described again herein.

An f-number of the zoom lens 400 is 1.51. After light passes through the last lens of the zoom lens 400, an image is formed on the image side and the height of the image is greater than or equal to 4 mm. Preferably, the image height may be between 4 mm to 10 mm, and more preferably between 4 mm and 8 mm. In the embodiment, a total length in the wide-end of the zoom lens divided by the image height is between 11.5 and 16.25, preferably between 12.75 and 15.25, and more preferably between 13.75 and 15.

TABLE 3D

| | | Wide-end | Tele-end |
|---|---|---|---|
| Variable | d1 | 11.2 | 2.5 |
| Distance (mm) | d2 | 7.7 | 0.1 |
| | d3 | 5.0 | 12.6 |

In summary, the zoom lens according to the embodiments of the invention is provided with the first lens group and the second lens group. The second lens group has at least one aspheric lens and at least one positive lens with an abbe number greater than 45. Therefore, the zoom lens can achieve an f-number as small as 1.80, thus having the advantage of a larger aperture. In addition, the zoom lens can reduce the aberration, achieve high imaging quality, and also be infrared confocal, so as to have clear imaging during the day and during the night (none or almost no visible light). Furthermore, due to the lens arrange of the zoom lens according to the embodiments, the zoom lens can achieve a large zoom ratio greater than 2.4, while also maintaining good imaging resolution. Finally, the zoom lens is adapted to be suitable for a large sensor (for example a phi 8 sensor). The zoom lens is also adapted to satisfy the requirements of a phi 14 connection surface or larger, which is where the lens are disposed relative to the image sensing element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its practical application, thereby to enable persons skilled in the art to understand the invention for various embodiments and with various modifications as are suited to the particular use or implementation contemplated. It is intended that the scope of the invention be defined by the claims appended hereto and their equivalents. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom lens arranged along an optical axis, the zoom lens comprising:
   a first lens group with negative refractive power;
   a second lens group with positive refractive power, the second lens group having at least one aspheric lens, the aspheric lens with positive refractive power and having an Abbe number greater than 71.5, wherein the second lens group has two cemented interfaces, wherein a zoom ratio of the zoom lens is greater than 1; and
   an aperture stop, the aperture stop being disposed between the first lens group and the second lens group, a position of the aperture stop in the zoom lens remaining unchanged in a zooming process of the zoom lens,
   wherein the number of lens with refractive power in the zoom lens is no more than 10, the first lens group and the second lens group are arranged in sequence from an object side to an image side,
   wherein the first lens group comprises a first lens, a second lens, and a third lens, arranged in sequence from the object side to the image side, and a refractive power of the first lens being negative, and
   wherein the second lens group comprises a fifth lens, a sixth lens, a seventh lens, an eighth lens, a ninth lens, and a tenth lens arranged in sequence from the object side to the image side, and refractive powers of the fifth lens, eighth lens, ninth lens, and tenth lens are respectively positive, positive, negative, and positive, wherein the refractive powers of the second lens and the third lens are respectively negative and positive.

2. The zoom lens as claimed in claim 1, wherein the at least one aspheric lens is formed of glass and having the Abbe number greater than 75.

3. The zoom lens as claimed in claim 1, further comprising an infrared cut filter, the infrared cut filter being disposed between the first lens group and the second lens group.

4. The zoom lens as claimed in claim 1, wherein the second lens group comprises a triple cemented lens.

5. A zoom lens arranged along an optical axis, the zoom lens comprising:
   a first lens group with negative refractive power;
   a second lens group with positive refractive power, the second lens group comprising two aspheric lenses, one of the said aspheric lenses having an Abbe number greater than 71.5, and one of the said aspheric lenses with positive refractive power, and the second lens group further comprising at least three lenses, the second lens group having two cemented interfaces; and
   an aperture stop, the aperture stop being disposed between the first lens group and the second lens group, a position the aperture stop in the zoom lens remaining unchanged in a zooming process of the zoom lens,
   wherein the number of lens with refractive power in the zoom lens is no more than 10, the first lens group and the second lens group are arranged in sequence from an object side to an image side and moveable with respect to each other, and the zoom lens has more than one magnification,
   wherein the first lens group comprises a first lens, a second lens, and a third lens, arranged in sequence from the object side to the image side, and a refractive power of the first lens, the second lens and the third lens are respectively negative, negative and positive; and
   wherein the second lens group comprises a fifth lens, a sixth lens, a seventh lens, an eighth lens, a ninth lens, and a tenth lens arranged in sequence from the object side to the image side, and refractive powers of the fifth lens, eighth lens, ninth lens, and tenth lens are respectively positive, positive, negative, and positive.

6. The zoom lens as claimed in claim 5, wherein the first lens group further comprises a fourth lens arranged in sequence after the third lens from the object side to the image side, and the refractive powers of the second lens, the third lens, and the fourth lens, the sixth lens, and the seventh lens are respectively positive, negative, positive, negative, and positive.

7. The zoom lens as claimed in claim 5, wherein the first lens group further comprises a fourth lens arranged in sequence after the third lens from the object side to the image side and the refractive powers of the fourth lens, the sixth lens, and the seventh lens are negative, positive, and negative.

8. The zoom lens as claimed in claim 5, wherein the refractive powers of the sixth lens and the seventh lens are respectively negative and positive.

9. The zoom lens as claimed in claim 5, wherein the abbe number of the at least one aspheric lens is greater than 80.

10. The zoom lens as claimed in claim 5, further comprising an infrared cut filter, the infrared cut filter being disposed between the first lens group and the second lens group.

11. The zoom lens as claimed in claim 5, wherein the second lens group comprises a triple cemented lens.

12. A zoom lens arranged along an optical axis, the zoom lens comprising:
   a first lens group with negative refractive power;
   a second lens group with positive refractive power, the second lens group having at least two aspheric lenses, which one of two aspheric lenses having an Abbe number greater than 71.5;
   wherein the number of lens with refractive power in the zoom lens is no more than 10, the first lens group and the second lens group is moveable with respect to each other and the zoom lens has more than one magnification, and a total length of the zoom lens in a wide angle end divided by an image height of the zoom lens is between 11.5 and 16.25, an image with height between 4-10 mm is formed after light passes through the last lens of the zoom lens on the image side, an f-number of the zoom lens is less than 1.8, and a zoom ratio of the zoom lens is greater than 2.4, wherein the first lens group and the second lens group are arranged in sequence from an object side to an image side.

13. The zoom lens as claimed in claim 12, further comprising an aperture stop, being disposed between the first lens group and the second lens group, the aperture stop remaining fixed in a zooming process of the lens zoom.

14. The zoom lens as claimed in claim 13, wherein the first lens group comprises a first lens, a second lens, and a third lens, arranged in sequence from the object side to the image side, and a refractive power of the first lens being negative,
   wherein the second lens group comprises a fifth lens, a sixth lens, a seventh lens, an eighth lens, a ninth lens, and a tenth lens arranged in sequence from the object side to the image side, and refractive powers of the fifth lens, eighth lens, ninth lens, and tenth lens are respectively positive, positive, negative, and positive, wherein the refractive powers of the second lens and the third lens are respectively negative and positive.

15. The zoom lens as claimed in claim 12, wherein the f-number ranges from 1.5 to 1.6, the zoom ratio ranges from 2.6 to 2.8.

16. The zoom lens as claimed in claim 12, wherein further comprising an infrared cut filter, the infrared cut filter being disposed between the first lens group and the second lens group.

* * * * *